(12) United States Patent
Ock

(10) Patent No.: US 12,308,400 B2
(45) Date of Patent: May 20, 2025

(54) BATTERY PACK

(71) Applicant: LG Chem, Ltd., Seoul (KR)

(72) Inventor: Jang-Soo Ock, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 934 days.

(21) Appl. No.: 16/982,657

(22) PCT Filed: Nov. 13, 2019

(86) PCT No.: PCT/KR2019/015473
§ 371 (c)(1),
(2) Date: Sep. 21, 2020

(87) PCT Pub. No.: WO2020/101364
PCT Pub. Date: May 22, 2020

(65) Prior Publication Data
US 2021/0036383 A1 Feb. 4, 2021

(30) Foreign Application Priority Data
Nov. 14, 2018 (KR) .................. 10-2018-0140231

(51) Int. Cl.
*H01M 10/42* (2006.01)
*H01M 10/44* (2006.01)
(Continued)

(52) U.S. Cl.
CPC ......... *H01M 10/425* (2013.01); *H01M 10/44* (2013.01); *H01M 50/116* (2021.01);
(Continued)

(58) Field of Classification Search
CPC .... H01M 10/42; H01M 10/425; H01M 10/44; H01M 2/06; H01M 2/02; H01M 2/0285; H01M 50/116; H01M 50/172
See application file for complete search history.

(56) References Cited

U.S. PATENT DOCUMENTS 4,781,624 A 11/1988 Shepherd
4,863,401 A * 9/1989 Talend ............... H01R 13/7197
439/607.43
(Continued)

FOREIGN PATENT DOCUMENTS

CN 103022404 A 4/2013
CN 105027358 A 11/2015
(Continued)

OTHER PUBLICATIONS

Extended European Search Report and Written Opinion for Application No. EP19885599.1 mailed Aug. 17, 2021, 8 pages.
(Continued)

*Primary Examiner* — Karie O'Neill Apicella
(74) *Attorney, Agent, or Firm* — Lerner David LLP

(57) ABSTRACT

A battery pack, which includes a pack connector having a simple structure and effectively preventing the inflow and outflow of noise. The battery pack includes a cell assembly having at least one secondary battery; a battery control unit configured to control a charging and discharging operation of the cell assembly; a pack case configured to accommodate the cell assembly and the battery control unit in an inner space thereof; and a pack connector connected to the battery control unit through a control cable and including a connection port provided to at least one side of the pack case to be exposed out for the connection with a connecting terminal of an external device and a filtering member embedded therein to filter noise on an electric path between the connection port and the control cable.

12 Claims, 15 Drawing Sheets

(51) Int. Cl.
*H01M 50/116* (2021.01)
*H01M 50/172* (2021.01)
*H01M 50/204* (2021.01)
*H01M 50/227* (2021.01)
*H01M 50/284* (2021.01)
*H01M 50/296* (2021.01)

(52) U.S. Cl.
CPC ....... *H01M 50/172* (2021.01); *H01M 50/204* (2021.01); *H01M 50/227* (2021.01); *H01M 50/284* (2021.01); *H01M 50/296* (2021.01); *H01M 2220/20* (2013.01)

(56) References Cited

U.S. PATENT DOCUMENTS

| | | | |
|---|---|---|---|
| 5,989,069 A | 11/1999 | Tan | |
| 7,525,825 B2 | 4/2009 | Korich et al. | |
| 2001/0006363 A1* | 7/2001 | Kawato | H05K 9/0018 |
| | | | 333/182 |
| 2010/0125388 A1 | 5/2010 | Nagatomo | |
| 2013/0108905 A1 | 5/2013 | Murakami et al. | |
| 2015/0171817 A1 | 6/2015 | Sun | |
| 2016/0006186 A1 | 1/2016 | Aizawa | |
| 2017/0062879 A1 | 3/2017 | Roh et al. | |
| 2017/0324266 A1 | 11/2017 | Park et al. | |
| 2018/0269440 A1 | 9/2018 | Lee et al. | |
| 2018/0294605 A1 | 10/2018 | Tizuka et al. | |
| 2019/0051875 A1* | 2/2019 | Choi | H01M 50/271 |
| 2020/0079233 A1 | 3/2020 | Kim | |
| 2020/0176826 A1 | 6/2020 | Yun et al. | |

FOREIGN PATENT DOCUMENTS

| | | |
|---|---|---|
| CN | 106537646 A | 3/2017 |
| CN | 108695631 A | 10/2018 |
| CN | 108780860 A | 11/2018 |
| EP | 2093848 A2 | 8/2009 |
| EP | 3142170 A1 | 3/2017 |
| EP | 3413374 A1 | 12/2018 |
| EP | 3675222 A1 | 7/2020 |
| JP | 3056735 U | 3/1999 |
| JP | 2001185891 A | 7/2001 |
| JP | 2007335277 A | 12/2007 |
| JP | 2010120459 A | 6/2010 |
| JP | 5912155 B2 | 4/2016 |
| JP | 6058260 B2 | 1/2017 |
| JP | 2017515267 A | 6/2017 |
| JP | 2019139898 A | 8/2019 |
| JP | 2020526160 A | 8/2020 |
| KR | 20150052755 A | 5/2015 |
| KR | 20150128604 A | 11/2015 |
| KR | 20170068406 A | 6/2017 |
| KR | 20170124867 A | 11/2017 |
| KR | 20180020523 A | 2/2018 |
| KR | 20180044714 A | 5/2018 |
| KR | 20180112309 A | 10/2018 |
| WO | 2018080022 A1 | 5/2018 |
| WO | 2019160302 A1 | 8/2019 |

OTHER PUBLICATIONS

International Search Report for Application No. PCT/KR2019/015473 mailed Feb. 21, 2020, 2 pages.
Search Report dated Apr. 24, 2024 from the Office Action for Chinese Application No. 201980034730.4 issued Apr. 27, 2024, 2 pages.

* cited by examiner

BATTERY PACK

CROSS-REFERENCE TO RELATED APPLICATIONS

The present application is a national phase entry under 35 U.S.C. § 371 of International Application No. PCT/KR2019/015473 filed Nov. 13, 2019, published in Korean, which claims priority from Korean Patent Application No. 10-2018-0140231 filed Nov. 14, 2018, all of which are incorporated herein by reference.

TECHNICAL FIELD

The present disclosure relates to a battery pack, and more particularly, to a battery pack having a noise removing function at a pack connector and a vehicle including the battery pack.

BACKGROUND ART

Currently commercialized secondary batteries include nickel cadmium battery, nickel hydrogen battery, nickel zinc battery, lithium secondary battery, and so on. Among these, the lithium secondary battery has almost no memory effect to ensure free charge and discharge, compared to the nickel-based secondary battery, and the lithium secondary battery is spotlighted due to a very low discharge rate and a high energy density.

The lithium secondary battery mainly uses a lithium-based oxides and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, or a battery case, for hermetically accommodating the electrode assembly together with an electrolyte.

Generally, the lithium secondary batteries may be classified into a can-type secondary battery having an electrode assembly included in a metal can and a pouch-type secondary battery having an electrode assembly included in a pouch of an aluminum laminate sheet, depending on the shape of the exterior.

Recently, the secondary batteries are widely used for driving and energy storage not only for small-sized devices such as portable electronic devices but also for medium-sized and large-sized devices such as a vehicle and an energy storage system (ESS). In this case, the secondary battery is provided to a battery pack and mounted to a middle-sized or large-sized device. At this time, in order to increase the capacity and output of the battery pack, the battery pack includes a large number of secondary batteries electrically connected to each other. Here, the plurality of secondary batteries may be accommodated in one module case to constitute one battery module, and at least one battery module may be accommodated in one pack case to constitute one battery pack.

The battery pack may be electrically connected to an external device to exchange power and data. However, if noise is introduced into the battery pack in this process, not only the battery pack but also other electronic equipment connected to the battery pack may be adversely affected. For example, in case of a battery pack mounted to a vehicle, noise may be introduced into the pack by another device in the vehicle, such as an inverter.

In this case, the introduced noise may cause a malfunction or interruption with correct operation to various electronic devices inside the battery pack, for example a battery control unit such as a battery management system (BMS), a current sensor, a temperature sensor, a relay, or the like. In addition, the noise introduced into the battery pack may affect other external electronic devices connected to the battery pack, for example a radio or a navigation of the vehicle, to cause a malfunction.

In particular, the noise generated from an inverter of a vehicle may be introduced into the battery pack through a connector provided to the battery pack. In addition, the connector may be electrically connected to electrical components such as a control unit through a control cable, and the introduced from an inverter or the like may be introduced into the battery pack through such a connector and a cable to cause various problems.

In order to solve this problem, conventionally, a technique of winding a filter element such as a ferrite core filter on a cable connected to a connector has been proposed. However, in this case, there is a problem that the energy density of the battery pack is lowered and internal components of the battery pack are not easily arranged. That is, since the filter element has a certain volume, the volume of the battery pack increases as much as the space occupied by the filter element, or the space occupied by other components such as secondary batteries is inevitably reduced. In addition, when the filter element is positioned inside the battery pack, the filter element needs to be fixed. However, the inner space of the battery pack is narrowed and the structure of the battery pack becomes complicated since a structure for fixing the filter element should be provided. In addition, in many cases, a wire is wound around the ferrite core filter more than once, but in this case, the manufacturing process may be complicated and the internal design may be difficult.

SUMMARY

Technical Problem

The present disclosure is designed to solve the problems of the related art, and therefore the present disclosure is directed to providing a battery pack, which includes a pack connector having a simple structure and effectively preventing the inflow and outflow of noise, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a cell assembly having at least one secondary battery; a battery control unit configured to control a charging and discharging operation of the cell assembly; a pack case configured to accommodate the cell assembly and the battery control unit in an inner space thereof; and a pack connector connected to the battery control unit through a control cable and including a connection port positioned along at least one side of the pack case to be exposed out for the connection with a connecting terminal of an external device and a filtering member embedded in the connection port and configured to filter noise on an electric path between the connection port and the control cable.

Here, the pack connector may further include a housing member having an inner space, and the filtering member may be a plate and is accommodated within the inner space of the housing member.

In addition, the filtering member may be a circuit board.

In addition, at least one edge of the filtering member may be in direct contact with the housing member.

In addition, he filtering member may include a ground terminal located at the at least one edge that is in direct contact with the housing member.

In addition, the housing member may include a ground connection portion made of an electrically conductive material to provide a path electrically connecting an inner surface and an outer surface of the housing member, and the ground terminal of the filtering member may be in direct contact with the ground connection portion.

In addition, the filtering member may be a polygonal plate, and the ground terminal may be located to at least two edges of the filtering member that are in contact with the housing member.

In addition, the housing member may include a perforated hole formed to penetrate between an inner space and an outer space thereof, and the filtering member may include a ground terminal protruding out of the housing member through the perforated hole of the housing member.

In addition, at least a portion of an edge of the filtering member may protrude out of the housing member through the perforated hole.

In addition, at least a portion of the pack case may be made of an electrically conductive material, and may be electrically connected to a ground terminal of the filtering member.

In addition, the pack case may include a chassis contact portion made of an electrically conductive material protruding outward from an outer surface of the at least a portion of the pack case, and may be electrically connected to the ground terminal of the filtering member.

In another aspect of the present disclosure, there is also provided a vehicle, comprising a battery pack of any of the embodiments of the present disclosure described herein.

In another aspect of the present disclosure, there is provided an apparatus, including a case configured to accommodate, in an inner space thereof, a cell assembly having at least one secondary battery and a battery control unit configured to control a charging and discharging operation of the cell assembly, a pack connector connected to the battery control unit through a control cable and including a connection port positioned along at least one side of the pack case to be exposed for the connection with a connecting terminal of an external device, and a filtering member embedded in the connection port and configured to filter noise on an electric path between the connection port and the control cable.

Advantageous Effects

According to an embodiment of the present disclosure, it is possible to effectively block noise flowing into or out of the battery pack through the connector.

In addition, according to another embodiment of the present disclosure, it is possible to prevent or minimize the increase in volume of the battery pack or the decrease in energy density to provide a noise blocking configuration.

In addition, according to still another embodiment of the present disclosure, it is possible to prevent the internal structure of the battery pack from being complicated by the noise removing configuration.

In addition, according to still another embodiment of the present disclosure, the battery pack including a noise removing configuration may be easily manufactured.

In addition, according to an embodiment of the present disclosure, the noise removing performance may be further improved by shortening a path for removing noise.

In addition, according to another embodiment of the present disclosure, the distance between the connection port for connecting a connecting terminal outside the battery pack and the connected control cable inside the battery pack may be shortened. Thus, if the filtering member is implemented in the form of a printed circuit board (PCB), the number of layers of the PCB may be reduced.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
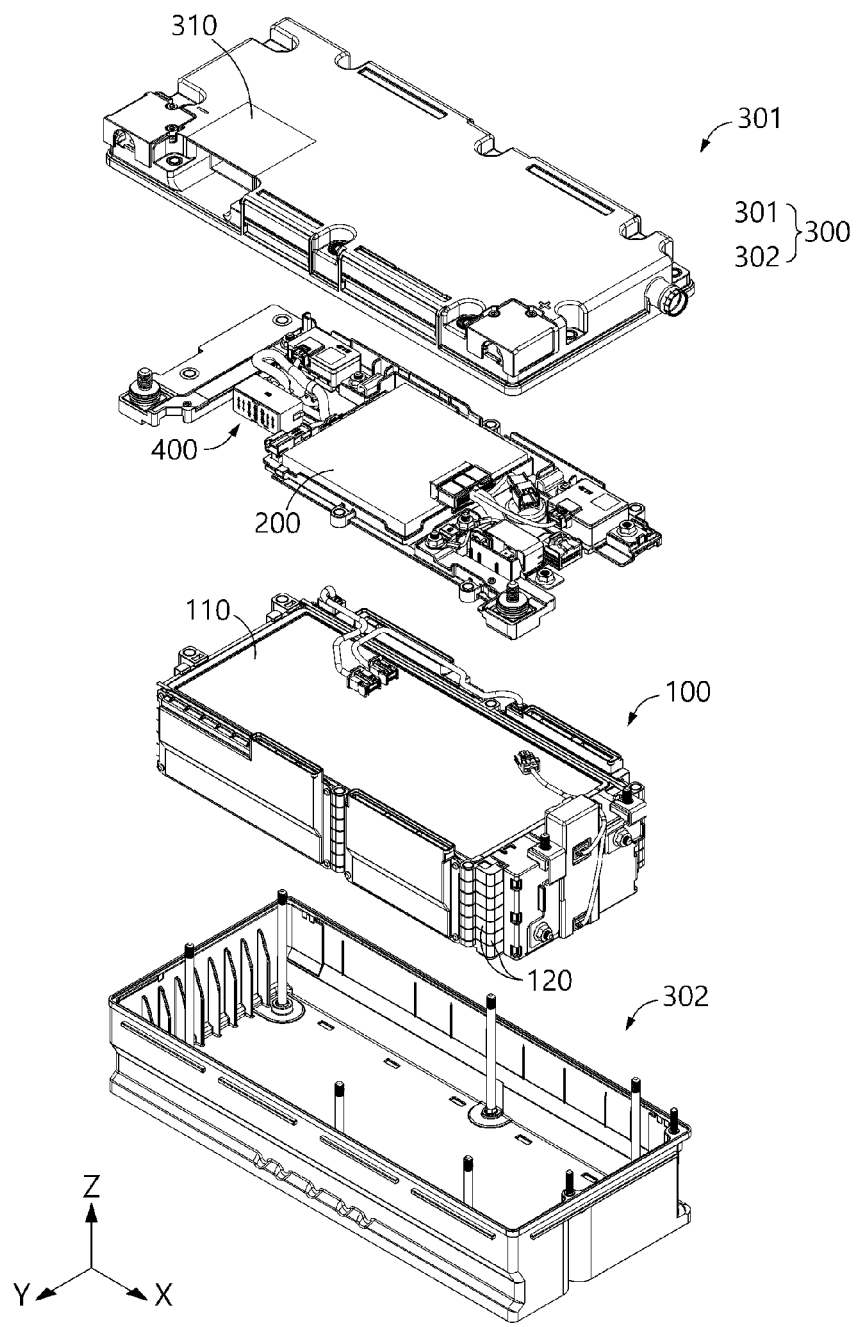
FIG. 1 is an exploded perspective view schematically showing a battery pack according to an embodiment of the present disclosure.
Figure 2:
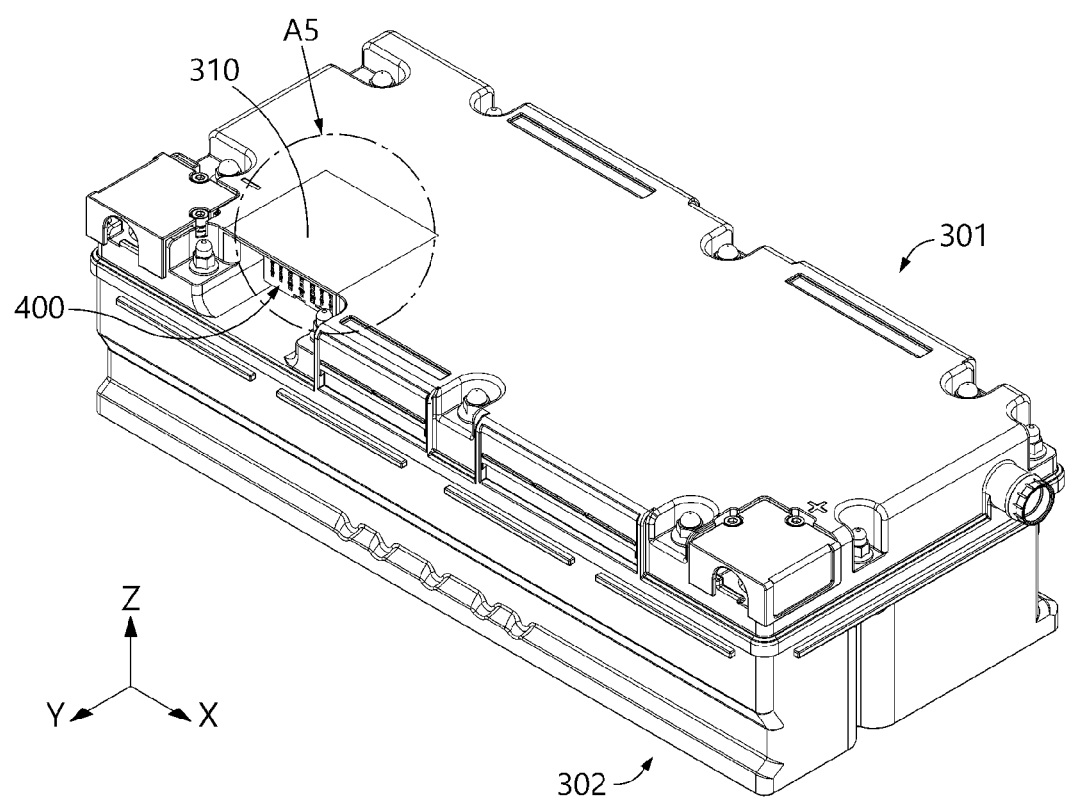
FIG. 2 is an assembled perspective view showing the configuration of FIG. 1.

FIG. 1 is an exploded perspective view schematically showing a battery pack according to an embodiment of the present disclosure, and FIG. 2 is an assembled perspective view showing the configuration of FIG. 1.

Referring to FIGS. 1 and 2, the battery pack according to the present disclosure may include a cell assembly 100, a battery control unit 200, a pack case 300, and a pack connector 400.

The cell assembly 100 may include a plurality of secondary batteries 110. The secondary battery 110 is a component that stores or emits an electrical energy through charging and discharging, and may be in the form of a pouch-type secondary battery. The secondary battery 110 may include an electrode assembly, an electrolyte, and a pouch exterior. Further, the secondary battery 110 according to the present disclosure may be a lithium secondary battery. In the cell assembly 100 of the battery pack according to the present disclosure, various types of secondary batteries known at the time of filing of this application may be employed.

A plurality of secondary batteries 110 may be included in the battery pack. In particular, the plurality of secondary batteries 110 may be pouch-type secondary batteries and be arranged vertically in a laying-down form such that their wide surfaces face up and down.

A cartridge 120 accommodates the secondary battery 110 in an inner space, and in particular, may be configured to surround an outer circumference of the secondary battery 110 from the outside. Further, the cartridge 120 may be in the form of a substantially rectangular ring to protect the outer side of the secondary battery 110. In addition, the cartridges 120 are configured to be stacked on each other and accommodates the secondary batteries 110 in the inner space in a stacked state, thereby stably maintaining the stacked state of the secondary batteries 110. Also, the cartridge 120 may include a cooling plate made of a thermally conductive material at a central portion thereof. The cartridge is well known at the time of filing of this application and thus will not be described in detail here.

The battery control unit 200 may control various operations of the battery pack. In particular, the battery control unit 200 may control the charging and/or discharging operation of the cell assembly 100. In addition, the battery control unit 200 may figure out the state of the battery pack. For example, the battery control unit 200 may figure out a charging and discharging current, a voltage and/or a temperature of the battery pack. In addition, the battery control unit 200 may figure out a voltage, a state of charge (SOC) and/or a state of health (SOH) of each secondary battery 110 included in the cell assembly 100.

The battery control unit 200 may be a battery management system (BMS) or may be configured to include the BMS. Generally, a conventional battery pack include the BMS. That is, a typical battery pack includes the battery control unit 200 such as a BMS, and the present disclosure is not limited to any specific type, shape or characteristic of the battery control unit 200. Further, two or more battery control units 200 may be included in a medium-sized or large-sized battery pack such as a battery pack for a vehicle. The battery pack of the present disclosure may employ various battery control units 200 known at the time of filing of this application, and such battery control units 200 will not be described in detail here.

The electric components provided in the battery pack may further include a current sensor, a relay, a fuse, and the like, in addition to the battery control unit 200 such as the battery management system. Here, the current sensor is a component for sensing a charging and discharging current of the battery pack, the relay is a switching component for selectively opening and closing a charging and discharging path through which the charging and discharging current of the battery pack flows. In addition, the fuse is a component provided on the charging and discharging path of the battery pack to block the flow of charging and discharging current by melting off when an abnormal situation occurs at the battery pack. The current sensor, the relay and the fuse may exchange information with the battery control unit 200 and may be controlled by the battery control unit 200. As shown in FIG. 1, the electrical components such as a current sensor, a relay and a fuse as well as the battery control unit 200 may be accommodated in the battery pack in the form of being mounted on one plate. For example, the plate on which the electric components are mounted may be located on the cell assembly 100.

The pack case 300 may have an empty space formed therein to accommodate components such as the cell assembly 100 and the battery control unit 200 in the inner space. In particular, as shown in the figures, the pack case 300 may include an upper case 301 and a lower case 302, so that the upper case 301 and the lower case 302 are coupled to each other. The pack case 300 may be made of a plastic material in order to secure electrical insulation, light weight and rigidity, but may also be made of other materials such as a metal material at least partially in order to increase cooling effect or rigidity. Alternatively, the pack case 300 may be made mainly of a metal material while maintaining electrical insulation with a region to which a pack terminal, namely a charging and discharging terminal (a positive electrode terminal and a negative electrode terminal), of the battery pack is provided.

The pack case 300 is configured to accommodate most components, for example such that components such as the cell assembly 100 or the battery control unit 200 are not exposed to the outside, thereby protecting the internal components against external physical and chemical factors. However, the pack case 300 may be configured such that the pack terminal is exposed to the outside so that a charging and discharging device outside the battery pack is connected thereto to allow a charging and discharging current to flow. For example, the pack case 300 may have two terminal holes, and the positive terminal and the negative terminal may be configured to pass through the terminal holes, respectively. In addition, the pack case 300 may be configured such that at least a portion of the pack connector 400 is exposed so that a connecting terminal connected to a device outside the battery pack may be connected thereto. For example, the pack case 300 may have a connecting hole such that a connection port of the connecting terminal is exposed to the outside.

The pack connector 400 may be connected to the battery control unit 200 through a control cable. In addition, the pack connector 400 may be connected to an external device through a connection port. The external device connected to the pack connector 400 is present outside the battery pack and may be configured to exchange various information with the battery pack. For example, the external device may be a device that receives various information such as voltage, current, temperature, SOC and SOH information of the battery pack from the battery control unit 200. Alternatively, the external device may be a device that transmits a command for controlling the charging and discharging operation with respect to the battery pack to the battery control unit 200.

As described above, the pack connector 400 may be configured to communicate with an external device. In addition, the pack connector 400 may serve as a passage for allowing a driving power to flow in and out from the external device to drive the battery control unit 200. That is, the pack connector 400 may be connected to the electrical components such as the battery control unit 200 to transmit a driving power or a communication signal.

In particular, in the battery pack according to the present disclosure, the pack connector 400 may be configured such that a filtering member is embedded. The detailed configuration of the pack connector 400 will be described in more detail with reference to FIGS. 3 and 4.

Figure 3:
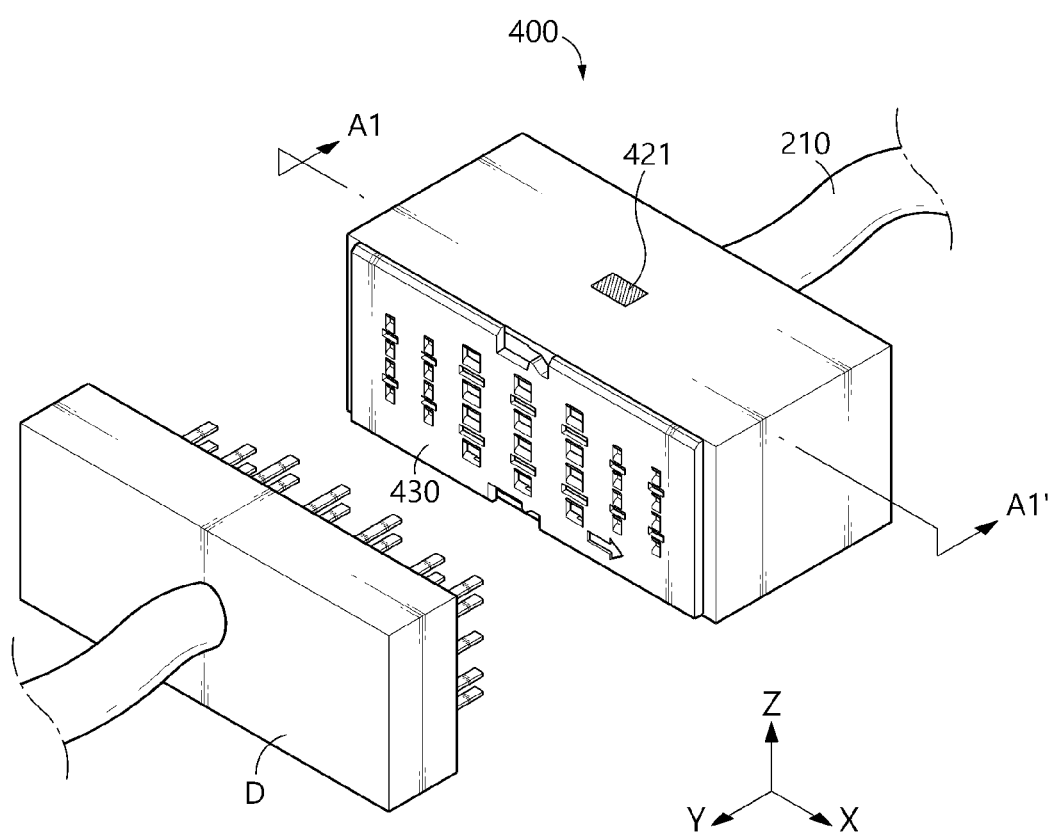
FIG. 3 is a perspective view schematically showing a pack connector according to an embodiment of the present disclosure.
Figure 4:
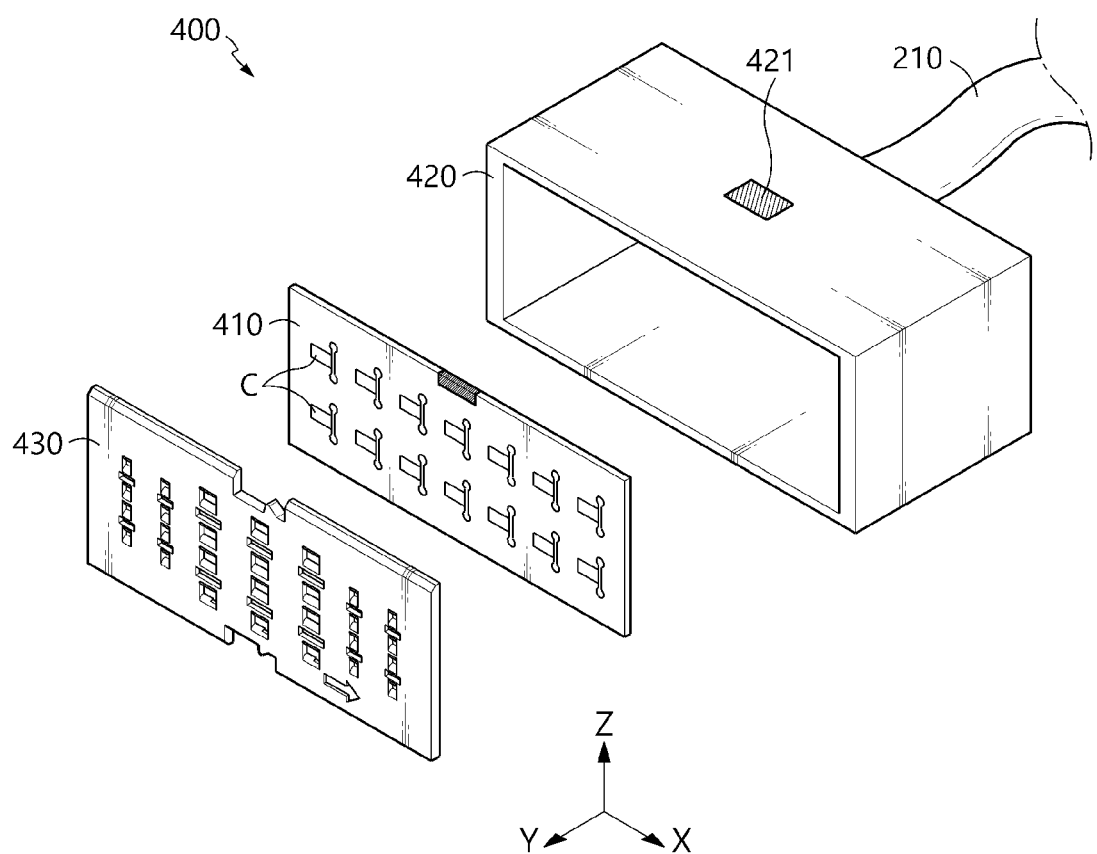
FIG. 4 is an exploded perspective view showing some components of FIG. 3.

FIG. 3 is a perspective view schematically showing a pack connector 400 according to an embodiment of the present disclosure, and FIG. 4 is an exploded perspective view showing some components of FIG. 3.

Referring to FIGS. 3 and 4, first, the pack connector 400 may include a connection port 430 provided at one side thereof. In addition, the connection port 430 may be configured such that a connecting terminal D of an external device located outside the battery pack is connected thereto. Moreover, the connection port 430 may be configured to be exposed out from at least one side of the pack case 300. For example, as shown in FIGS. 1 and 2, the pack connector 400 may be located at an upper portion of the battery pack, and the connection port 430 of the pack connector 400 may be exposed to the outside at one side of the upper case 301. Meanwhile, the connecting terminal D of the external device is a component included in the external device and may be configured to be connectable to the connection port 430 of the pack connector 400.

In particular, as shown in FIGS. 3 and 4, the pack connector 400 according to the present disclosure may include a filtering member 410 included therein.

The filtering member 410 may have one side connected to the connection port 430 and the other side connected to the control cable 210. In addition, the filtering member 410 may provide an electric path through which a current for a signal or a power may flow between the connection port 430 and the control cable 210. Further, the filtering member 410 may filter noise on the electric path between the connection port 430 and the control cable 210.

The filtering member 410 may include at least one element for filtering noise on the electric path. For example, the filtering member 410 may include at least one capacitor C as an element for filtering noise. Further, the filtering member 410 may include a Y capacitor. Also, the filtering member 410 may include an inductor as an element for filtering noise. The specific configuration of the filtering member 410 is widely known at the time of filing of this application and thus will not be described in detail here. In addition, the present disclosure is not limited to the specific form of the filtering element applied to the pack connector 400, and various noise filtering circuit configurations known at the time of filing of this application may be employed by the filtering member 410 of the present disclosure. For example, the filtering element of the filtering member 410 may include an element for filtering common mode noise and/or an element for filtering normal mode noise.

In addition, as shown in FIG. 4, the pack connector 400 according to the present disclosure may include a housing member 420.

The housing member 420 may have an empty space formed therein. In addition, the housing member 420 may be made of an electrically insulating material such as plastic. Also, the control cable 210 may be connected to one side of the housing member 420. In addition, although not shown in the figures, the control cable 210 may be connected to the electric path of the filtering member 410. Thus, the signal or power flowing into and out of the battery control unit 200 through the control cable 210 may flow in the electric path of the filtering member 410.

In addition, the housing member 420 may include a connection port 430 provided to one side thereof so as to be connected to the connecting terminal D outside the battery pack. In this case, the connection port 430 may be configured as a part of the housing member 420 or may be configured to be accommodated in the inner space of the housing member 420 and coupled to one side of the housing member 420 as a component separate from the housing member 420. For example, the connection port 430 may be accommodated in the inner space at a front side of the housing member 420 and coupled to a front end of the housing member 420. Meanwhile, the connecting terminal D may be a terminal provided in the external device to be connected to the battery pack. For example, in the case of a battery pack for a vehicle, the battery pack may be connected to an electronic control unit (ECU) of the vehicle to exchange signals. In this case, the connecting terminal D of the external device may be a connection terminal provided in or connected to the ECU. A connection component for electrically connecting to the connecting terminal D outside the battery pack, such as a conductor pin, may be present in the connection port 430 of the housing member 420. In addition, the connection component such as a conductor pin may be connected to the electric path of the filtering member 410 directly or indirectly. Thus, when power or signal flows into the battery pack from the external device through the connection port 430 or when power or signal flows from the battery pack to the external device through the connection port 430, the corresponding power or signal must pass through the filtering member 410.

Further, the housing member 420 may be configured such that the control cable 210 is connected to an inner end thereof and the connection port 430 is provided at an outer end thereof. Here, the outer may refer to a direction (+y-axis direction in the drawing) toward the outside rather than the inner space of the battery pack. On the contrary, the inner may refer to a direction (−y-axis direction in the drawing) toward the inner space of the battery pack, namely toward the battery control unit 200.

In particular, as shown in FIG. 4, the filtering member 410 may be configured in the form of a plate. In addition, the plate-like filtering member 410 may be accommodated in the inner space of the housing member 420 entirely or mostly.

If the filtering member 410 is formed in a plate shape as described above, the filtering member 410 may be easily positioned in the inner space of the housing member 420 that forms the exterior of the pack connector 400. Moreover, if the filtering member 410 is configured in a plate shape, it may be easy to secure a space in which components other than the filtering member 410 provided in the pack connector 400 are positioned. In addition, if the filtering member 410 is formed in a plate shape, it is easy to provide an electric path through which a current flows in the filtering member 410, and it is easy to attach various components such as a capacitor or an inductor for filtering to a base material of a plate shape. In addition, since the filtering member 410 and the housing member 420 are coupled well, the filtering member 410 may be stably fixed inside the housing member 420.

Preferably, the filtering member 410 may be configured in the form of a circuit board. In particular, the filtering member 410 may be configured in the form of a printed circuit board (PCB). The printed circuit board may be configured in a form where a circuit made of a metal material is printed on an insulating substrate such as plastic. The configuration of the printed circuit board is well known at the time of filing of this application and thus will not be described in detail here.

In the present disclosure, if the filtering member 410 is configured in the form of a circuit board, a filtering element such as a capacitor or an inductor may be provided on the circuit configured in the circuit board. For example, the circuit of the circuit board may include a common mode noise filter and/or a normal mode noise filter. In addition, the filtering member 410 configured in the form of a circuit board may include a ground terminal. In the filtering member, the ground terminal may serve as an outlet through which the noise component filtered by the filtering element is discharged to the outside. That is, the noise component does not flow on the electric path between the external device connected to the connection port 430 and the battery control unit 200, but may be discharged to the outside, for example to a vehicle chassis, through the ground terminal.

Meanwhile, in the embodiment in which the filtering member 410 is configured in the form of a circuit board, the connection port 430 and the control cable 210 may be connected to different surfaces of the filtering member 410. For example, in the embodiment of FIG. 4, assuming that the +y-axis direction is a front direction of the battery pack and the −y-axis direction is a rear direction of the battery pack, the connection port 430 may be connected to the front side of the filtering member 410. Also, the control cable 210 may be connected to the rear side of the filtering member 410.

According to this configuration of the present disclosure, the configuration for connecting the connection port 430 and the configuration for connecting the control cable 210 are provided on different surfaces of the circuit board (the filtering member), thereby simplifying the configuration of the circuit board. In particular, according to this configuration of the present disclosure, a connection point of the connection port 430 and a connection point of the control cable 210 may be formed short in the circuit board (the filtering member). Thus, in this case, the number of layers of the printed circuit board may be reduced. For example, according to the configuration, the PCB constituting the filtering member may be configured to have one layer. Thus, according to this configuration, it is possible to simplify the structure of the filtering member 410, improve the efficiency of the manufacturing process and reduce the manufacturing cost.

The filtering member 410 may be configured such that at least one side of an edge thereof is in direct contact with the housing member 420. Here, the edge may refer to a border portion of the filtering member. In particular, if the filtering member 410 is configured in the form of a plate, a side portion which is the edge of the filtering member 410 may be in direct contact with the housing member 420. For example, if the filtering member 410 is configured in the form of a disc or a polygonal plate, at least a portion of the edge may be configured to directly contact the inner surface of the housing member 420. Further, the filtering member 410 may be configured such that at least one side (edge) is in contact with the housing member 420 entirely.

According to this configuration of the present disclosure, the coupling between the edge portion of the filtering member 410 and the housing member 420 may be improved. Moreover, a fastening configuration for coupling with the edge of the filtering member 410, such as a hook coupling portion or an insertion coupling portion, may be provided to the inner surface of the housing member 420. In addition, according to this configuration of the present disclosure, it may be more advantageous to improve the performance of discharging the noise component from the filtering member 410 to the outside of the battery pack.

Preferably, the ground terminal may be located at the edge of the filtering member 410. This will be described in more detail with reference to FIG. 5.

Figure 5:
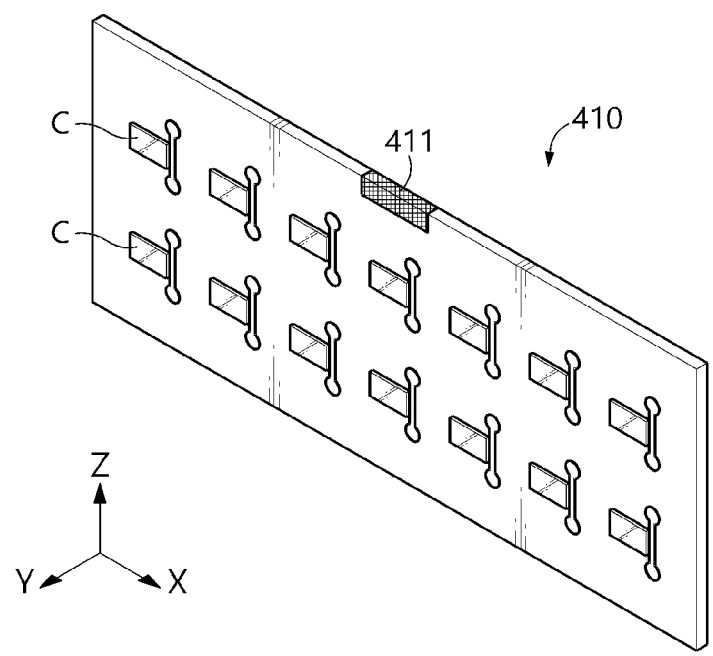
FIG. 5 is a perspective view schematically showing a filtering member according to an embodiment of the present disclosure.

FIG. 5 is a perspective view schematically showing a filtering member 410 according to an embodiment of the present disclosure. Regarding this figure, features that may be applied identically or similarly to the above description will not be described in detail, and different features will be mainly described.

Referring to FIG. 5, the filtering member 410 may be configured in the form of a PCB, and a ground terminal 411 may be provided at one side of the edge thereof. Moreover, the ground terminal 411 may be configured such that at least a portion of the ground terminal 411 contacts the border (side) portion of the filtering member 410. In particular, the filtering member 410 may be configured to stand upright such that both broad surfaces thereof are facing horizontally. In this case, the ground terminal 411 of the filtering member 410 may be located at an upper edge. In addition, the noise component filtered by the filtering member 410 may be discharged out of the battery pack, for example the chassis of the vehicle, through the ground terminal 411. Meanwhile, unless stated otherwise, in this specification, the horizontal direction may refer to one direction on the bottom surface of the battery pack, namely a plane (a horizontal plane) parallel to the ground, when the battery pack is placed on the ground. In addition, in this specification, the vertical direction may refer to a direction orthogonal to the horizontal plane and may be expressed in an upper and lower direction.

In an embodiment of the present disclosure where the ground terminal 411 is positioned at the edge of the filtering member 410, the configuration for discharging the noise component to the outside of the battery pack from the ground terminal 411 of the filtering member 410 may be easily obtained. The noise component filtered by the filtering member 410 may be discharged to the outside through the ground terminal 411. In this case, if the ground terminal 411 of the filtering member 410 configured in the form of a plate, particularly a PCB, is positioned at the edge, the ground terminal 411 may easily come into direct contact with the housing member 420 of the pack connector 400 or be exposed out of the housing member 420. Thus, the ground terminal 411 may be located closer to the noise discharging path such as the vehicle chassis. Thus, the noise removing distance for discharging noise from the ground terminal 411 to the vehicle chassis may be shortened, thereby further improving the noise removing performance.

In particular, the ground terminal 411 of the filtering member 410 may be in direct contact with the housing member 420 of the pack connector 400 or may be in direct contact with the pack case 300 or the vehicle chassis without passing through the housing member 420. In this case, the noise removing path from the ground terminal 411 to the vehicle chassis is shortened further, thereby further improving the noise removing performance Moreover, according to this configuration of the present disclosure, a separate connection configuration such as a cable may not be provided to the noise removing path between the ground terminal 411 of the filtering member 410 and the pack case 300 or between the ground terminal 411 of the filtering member 410 and the vehicle chassis. Thus, it is advantageous to simplify components of the battery pack and to improve the efficiency of the manufacturing process. Also, the noise removing path may be shortened, thereby further improving the noise removing efficiency.

In addition, as shown in FIGS. 3 and 4, the pack connector 400 may include a ground connection portion 421. In addition, the ground terminal 411 of the filtering member 410 may be configured to directly contact the ground connection portion 421 of the pack connector 400. This configuration will be described in more detail with reference to FIG. 6.

Figure 6:
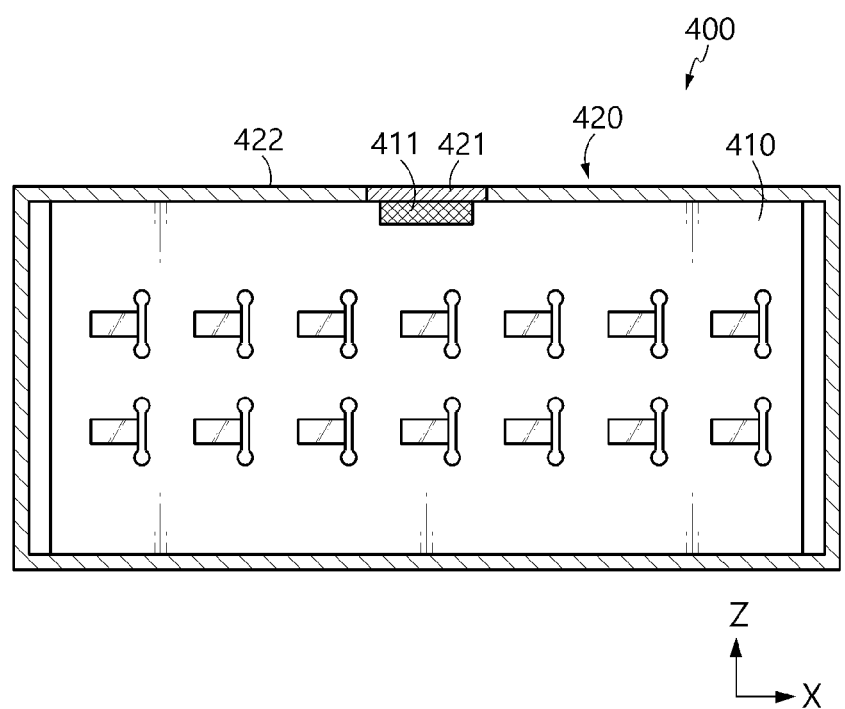
FIG. 6 is a schematic cross-sectioned view, taken along the line A1-A1' of FIG. 3.

FIG. 6 is a schematic cross-sectioned view, taken along the line A1-A1' of FIG. 3. However, in FIG. 6, only the housing member 420 and the filtering member 410 are depicted for convenience of explanation, even though other components may be further included in the pack connector 400.

Referring to FIG. 6, the ground connection portion 421 may be provided to the housing member 420 of the pack connector 400. The ground connection portion 421 may be made of an electrically conductive material unlike other portions of the housing member 420. In addition, the housing member 420 may be made of an electrically insulating material such as plastic in the entire region of the body 422 except for the ground connection portion 421. Thus, the housing member 420 of the pack connector 400 may electrically insulate internal components from the outside due to the electrical insulation of the body 422. Meanwhile, the ground connection portion 421 may be made of a metal material such as copper, steel and aluminum to move noise components.

In particular, the ground connection portion 421 may provide a path for electrically connecting the inner surface and the outer surface of the housing member 420. Here, the inner surface may refer to a surface located in the inner space of the housing member 420, and the outer surface may refer to a surface located at the outside of the housing member 420. For example, as shown in FIG. 6, the ground connection portion 421 may be configured to penetrate from the inner side to the outer side to electrically connect the inner surface and the outer surface of the housing member 420. In addition, the ground terminal 411 of the filtering member 410 may be in direct contact with the inner portion of the ground connection portion 421. Also, although not shown in the figures, a chassis serving as the ground, for example a chassis of the vehicle, or a portion of the pack case 300 made of an electrically conductive material connected to the chassis may be in direct contact with an outer portion of the ground connection portion 421.

Figure 7:
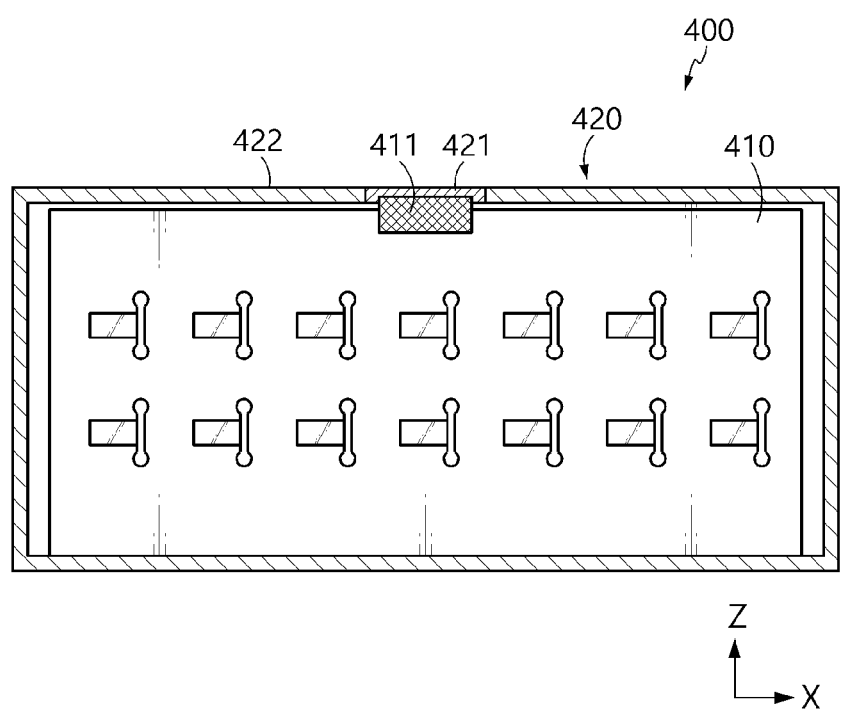
FIG. 7 is a cross-sectioned view schematically showing a pack connector according to another embodiment of the present disclosure.

FIG. 7 is a cross-sectioned view schematically showing a pack connector 400 according to another embodiment of the present disclosure. FIG. 7 may be a modified form of FIG. 6. In this embodiment, features different from the former embodiment will be mainly described.

Referring to FIG. 7, the ground terminal 411 may be provided to the filtering member 410, the ground connection portion 421 may be provided to the housing member 420, and the ground terminal 411 and the ground connection portion 421 may be fastened with each other by insertion. In particular, the ground terminal 411 and the ground connection portion 421 may be formed with uneven portions corresponding to each other. For example, as shown in FIG. 7, at least a portion of the ground terminal 411 may be configured to protrude convexly in an outward direction, for example in an upper direction (+z-axis direction in the drawing). In addition, the ground connection portion 421 may be configured to be concavely recessed upward corresponding to the protruding shape of the ground terminal 411. In this case, the convex portion of the ground terminal 411 may be inserted into and coupled to the concave portion of the ground connection portion 421.

According to this configuration of the present disclosure, the contact between the ground terminal 411 of the filtering member 410 and the ground connection portion 421 of the housing member 420 may be more stably maintained. In addition, due to the concave-convex coupling configuration, the filtering member 410 may be stably positioned without moving in the inner space of the housing member 420. Also, the concave-convex coupling configuration may guide the assembling between the filtering member 410 and the housing member 420, thereby improving the efficiency of the manufacturing process of the pack connector 400.

Figure 8:
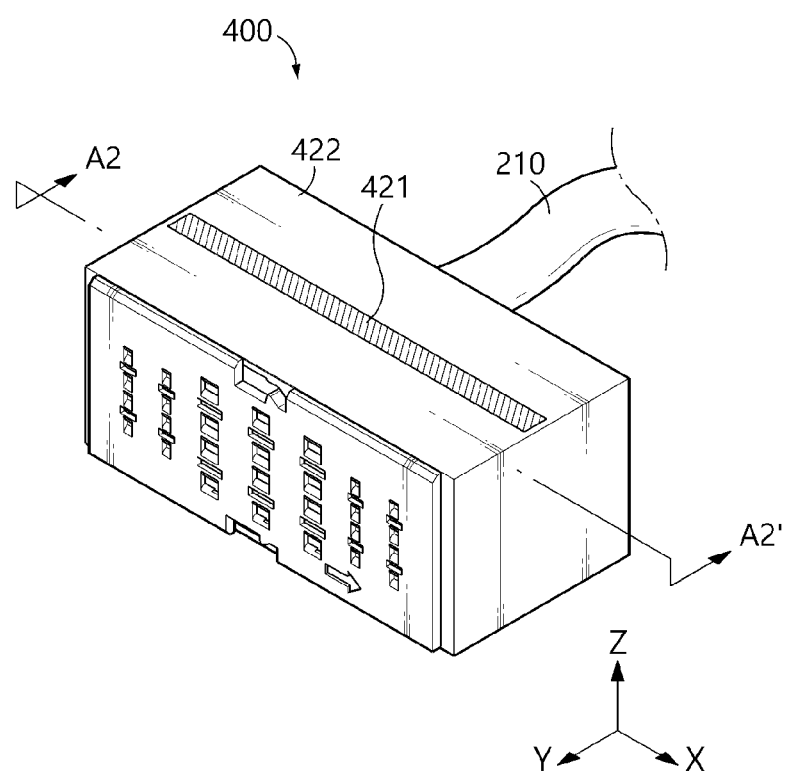
FIG. 8 is a perspective view schematically showing the pack connector according to another embodiment of the present disclosure.
Figure 9:
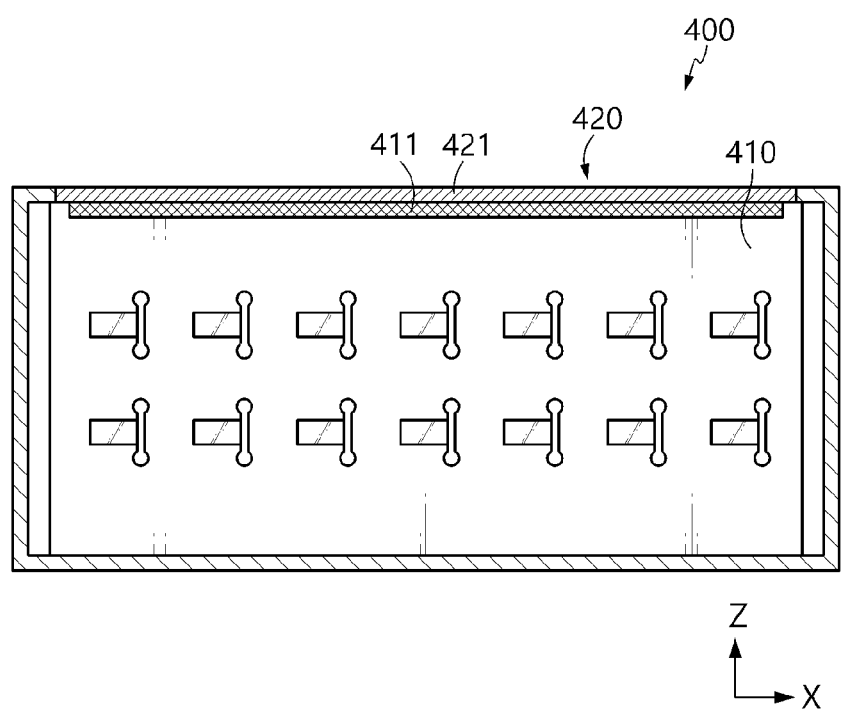
FIG. 9 is a cross-sectioned view, taken along the line A2-A2' of FIG. 8.

FIG. 8 is a perspective view schematically showing the pack connector 400 according to another embodiment of the present disclosure. Also, FIG. 9 is a cross-sectioned view, taken along the line A2-A2' of FIG. 8. FIG. 8 may be a modified example of FIG. 3, and FIG. 9 may be another modified example of FIG. 6. In this embodiment, features different from the former embodiment will be mainly described.

First, referring to FIG. 9, the ground terminal 411 of the filtering member 410 may be configured to extend long in at least one direction at the edge of the filtering member 410. For example, the ground terminal 411 may be positioned at the upper edge of the filtering member 410 to extend long in a horizontal direction, for example in a left and right direction (x-axis direction in the drawing). In this case, the ground terminal 411 may occupy the whole part of the upper edge of the filtering member 410 or may occupy most of the upper edge of the filtering member 410 except for a portion.

In addition, the ground connection portion 421 of the housing member 420 may be configured to extend long in at least one direction to correspond to the shape of the ground terminal 411. For example, as shown in FIGS. 8 and 9, the ground connection portion 421 may be positioned in an upper portion of the housing member 420 to extend long in a left and right direction.

According to this configuration of the present disclosure, the contact area between the ground terminal 411 of the filtering member 410 and the ground connection portion 421 of the housing member 420 may be enlarged. Thus, the noise removing path for discharging noise from the filtering member 410 to the outside of the pack connector 400 through the housing member 420 may be more widely secured, thereby improving the noise removing performance.

Meanwhile, the filtering member 410 may be configured in the form of a polygonal plate. For example, as shown in several figures, the filtering member 410 may be configured in the form of a rectangular plate. If the filtering member 410 is configured in the form of a polygonal plate as above, the filtering member 410 may have three or more edges (sides). For example, the filtering member 410 configured in the form of a rectangular plate may have approximately four edges along its girdle.

If the filtering member 410 is configured in the form of a polygonal plate as above, the ground terminal 411 may be located on at least two edges among the edges of the filtering member 410. In addition, the ground terminals 411 located at the two edges may directly contact the housing member 420. This configuration of the present disclosure will be described in more detail with reference to FIG. 10.

Figure 10:
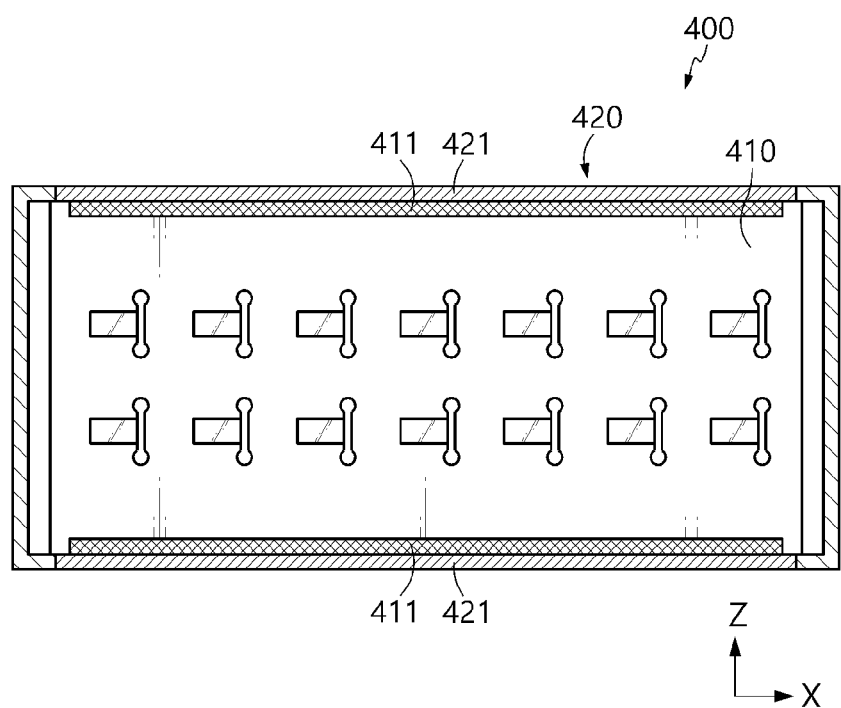
FIG. 10 is a cross-sectioned view schematically showing a pack connector according to still another embodiment of the present disclosure.

FIG. 10 is a cross-sectioned view schematically showing a pack connector 400 according to still another embodiment of the present disclosure. FIG. 10 may be another modified example of FIG. 6. In this embodiment, features different from the former embodiment will be mainly described.

Referring to FIG. 10, the filtering member 410 is configured in the form of a rectangular plate, and the ground terminal 411 may be located on two edges. For example, the ground terminal 411 may be positioned at the upper edge and the lower edge of the rectangular plate to extend long in the left and right direction.

Corresponding to the configuration of the filtering member 410, the housing member 420 may have the ground connection portion 421 at the upper side and the lower side, respectively. In addition, the two ground connection portions 421 may be configured to extend long from a left end to a right end of the housing member 420, respectively. Thus, the two ground terminals 411 of the filtering member 410 may be in direct contact with the two ground connection portions 421 of the housing member 420, respectively.

According to this configuration of the present disclosure, the contact area between the ground terminal 411 of the filtering member 410 and the ground connection portion 421 of the housing member 420 may be further enlarged. Thus, the noise removing path for discharging nose out of the battery pack through the ground terminal 411 of the filtering member 410 and the ground connection portion 421 of the housing member 420 may be more sufficiently secured. Therefore, in this case, the noise removing performance may be further improved.

Figure 11:
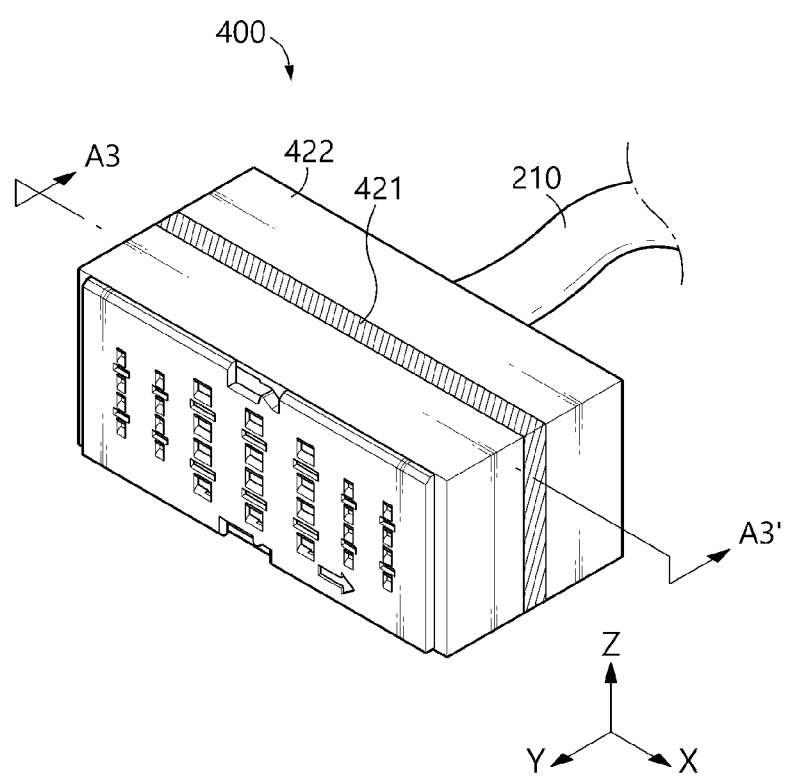
FIG. 11 is a perspective view schematically showing a pack connector according to still another embodiment of the present disclosure.
Figure 12:
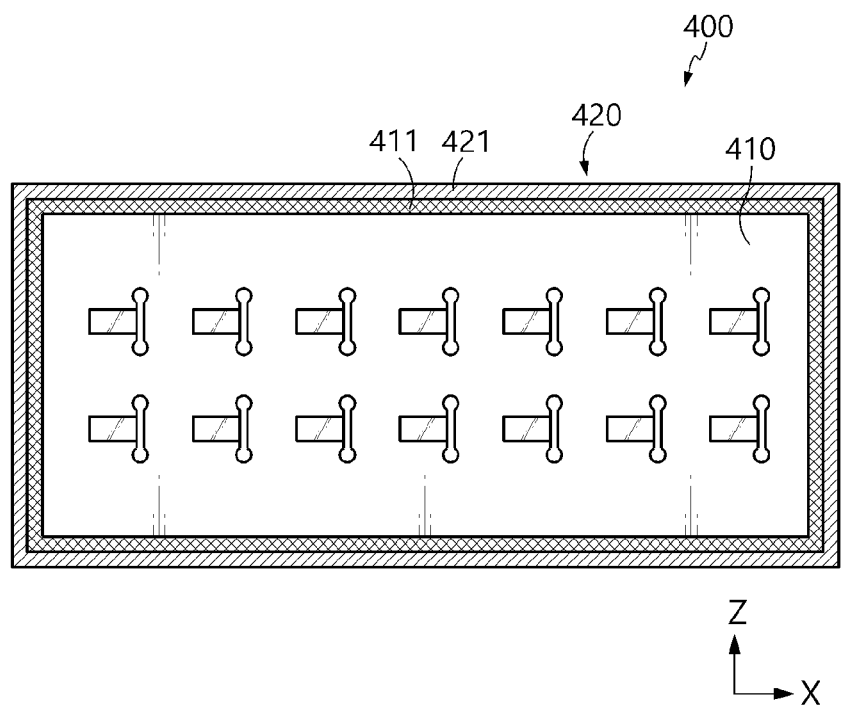
FIG. 12 is a cross-sectioned view, taken along the line A3-A3' of FIG. 11.

FIG. 11 is a perspective view schematically showing a pack connector 400 according to still another embodiment of the present disclosure. Also, FIG. 12 is a cross-sectioned view, taken along the line A3-A3' of FIG. 11. Here, FIG. 11 may be another modified example of FIG. 3, and FIG. 12 may be another modified example of FIG. 6. Here, features different from the former embodiment will be mainly described.

First, referring to FIG. 12, the filtering member 410 may be configured such that the ground terminal 411 is provided to all edges of the filtering member 410. For example, if the filtering member 410 is configured in the form of a rectangular plate, four edges are present in the filtering member 410, where the ground terminal 411 may be provided to all of four edges of the filtering member 410.

In particular, the ground terminal 411 may be configured to surround the edge portion of the filtering member 410. For example, if the filtering member 410 is configured in the form of a rectangular plate, as shown in FIG. 12, the ground terminal 411 may be configured in the form of a substantially rectangular ring.

In addition, the ground connection portion 421 may be provided to the housing member 420 to have a position and shape corresponding to the ground terminal 411 of the filtering member 410. For example, as shown in FIGS. 11 and 12, the ground connection portion 421 of the housing member 420 may be provided to an upper surface, a lower surface, a left surface and a right surface of the housing member 420, except for a front surface and a rear surface of the housing member 420. In particular, if the ground terminal 411 is formed in a ring shape, the ground connection portion 421 may also be configured in a ring shape extending along the inner circumference and the outer circumference of the housing member 420.

According to this configuration of the present disclosure, the noise discharging path may be formed at all edges of the filtering member 410. Thus, the contact area between the ground terminal 411 and the ground connection portion 421 is further enlarged, thereby improving the noise removing performance by the filtering member 410 more remarkably. In addition, in this configuration of the present disclosure, since the housing member 420 is in contact with all edges of the filtering member 410, the coupling between the filtering member 410 and the housing member 420 may also be secured better.

However, even though FIGS. 11 and 12 depict that the ground terminal 411 and the ground connection portion 421 are respectively provided to all edges of the filtering member 410 and the housing member 420 and connected to each other, the ground terminal 411 and the ground connection portion 421 may also be separated from each other at each edge, without being connected to each other. In this case, two or more ground terminals 411 and/or two or more ground connection portions 421 may be provided to one pack connector 400.

Meanwhile, in order to provide the ground terminals 411 to all edges of the filtering member 410 and connect the ground terminals 411 to the ground connection portions 421 of the housing member 420, the housing member 420 may be shaped corresponding to the filtering member 410. For example, if the filtering member 410 is in the form of a rectangular plate, the housing member 420 may be configured in the form of a rectangular tube or rectangular box. In this case, the configuration where all edges of the filtering member 410 are in contact with the inner surface of the housing member 420 may be more easily achieved.

Meanwhile, the filtering member 410 may be provided inside the housing member 420 in a standing-up form. In this case, the filtering member 410 may be configured such that at least the upper edge and/or the lower edge thereof is in direct contact with the upper portion and/or the lower portion of the housing member 420.

According to this configuration of the present disclosure, the configuration where the filtering member 410 is in contact with the pack case 300, the vehicle chassis, or the like located outside the housing member 420 may be more easily achieved. In a device to which the battery pack is mounted, for example a vehicle, the battery pack may be easily in contact with the chassis at an upper portion or a lower portion thereof. Accordingly, as at least the upper edge and/or the lower edge of the filtering member 410 is in contact with the housing member 420, the noise removing path from the filtering member 410 to the chassis of the vehicle may be shortened.

Moreover, if the pack connector 400 is located at the upper side of the battery pack such that the connection port 430 is formed at the upper case 301 to be exposed out, at least the upper edge of the filtering member 410 may be configured to be in direct contact with the upper portion of the housing member 420, or the pack case 300 or the chassis. Alternatively, if the connection port 430 is formed at the lower case 302 to be exposed out, at least the lower edge of the filtering member 410 may be configured to be in direct contact with the lower portion of the housing member 420, or the pack case 300 or the chassis.

In addition, if the filtering member 410 is configured to stand upright, the connection configuration between the control cable 210 at the inside and the connection port 430 at the outside may be more easily achieved. In particular, if the filtering member 410 in the form of a PCB is provided to stand upright such that one side faces outward and the other side faces inward, the connection port 430 located at the outside may be easily connected to one side the filtering member 410, and the control cable 210 located at the inside may be easily connected to the other side of the filtering member 410.

Figure 13:
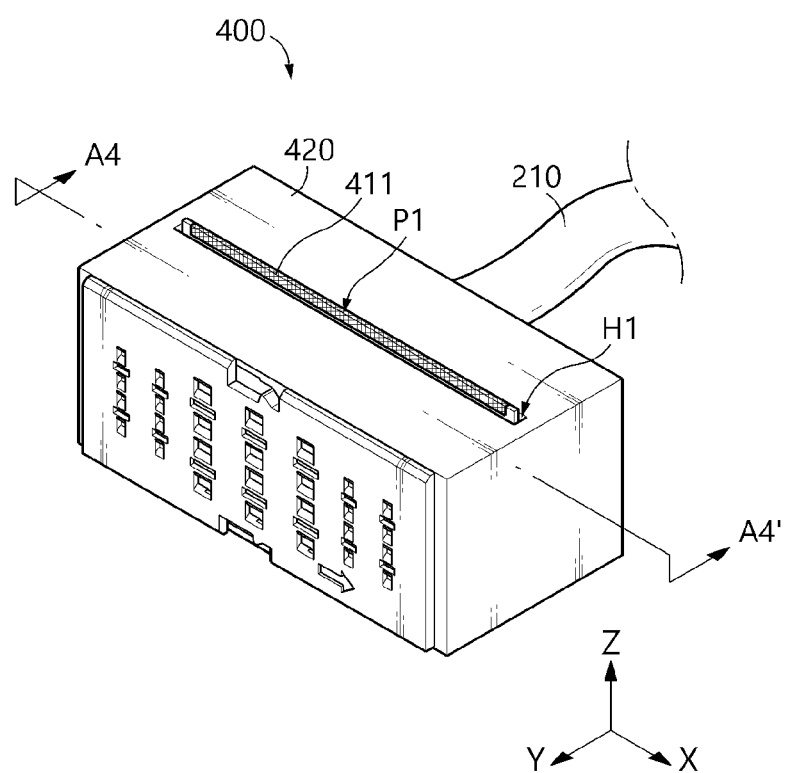
FIG. 13 is a perspective view schematically showing a pack connector according to still another embodiment of the present disclosure.
Figure 14:
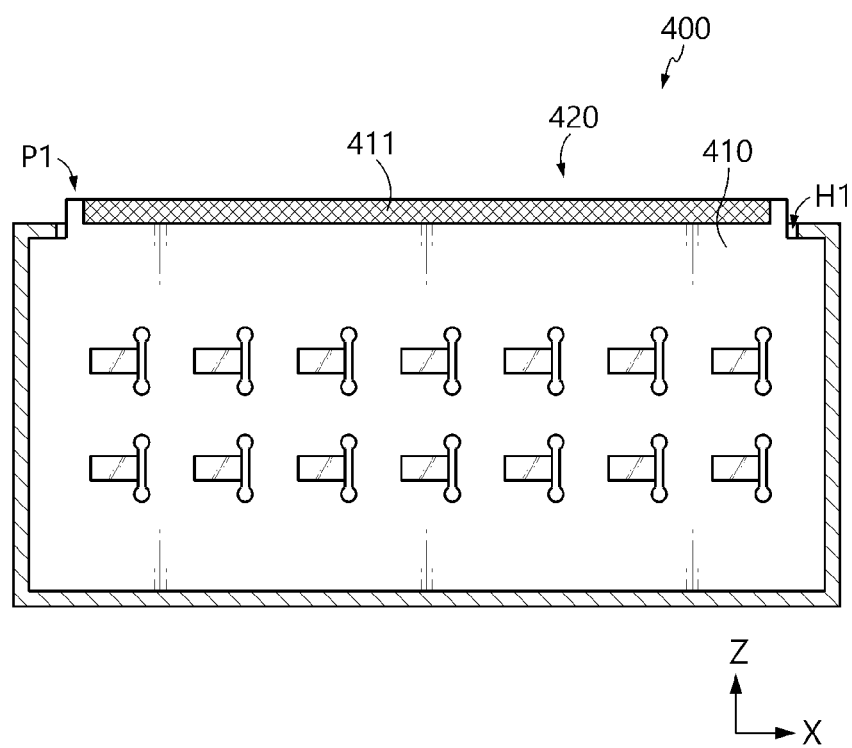
FIG. 14 is a cross-sectioned view, taken along the line A4-A4' of FIG. 13.

FIG. 13 is a perspective view schematically showing a pack connector 400 according to still another embodiment of the present disclosure. Also, FIG. 14 is a cross-sectioned view, taken along the line A4-A4' of FIG. 13. Here, features different from the former embodiment will be mainly described.

Referring to FIGS. 13 and 14, as indicated by H1, the pack connector 400 may have a perforated hole formed to penetrate between the inside and the outside. In particular, the housing member 420 of the pack connector 400 may have a hole formed to penetrate between the inner space and the outer space. For example, the housing member 420 may have a perforated hole H1 formed in at least one side thereof, for example in an upper portion thereof, to penetrate in a vertical direction, as shown in the figures.

In addition, the filtering member 410 may be configured such that the ground terminal 411 is exposed out of the pack connector 400 through the perforated hole H1 of the housing member 420.

According to this configuration of the present disclosure, the ground terminal 411 may directly contact the conductive material portion of the pack case 300 or the chassis of a vehicle or the like through the perforated hole H1 of the housing member 420. Thus, the noise component emitted from the filtering member 410 may be directly discharged out of the pack connector 400 without passing through the housing member 420. In this case, therefore, there is no need to provide an electrically conductive material portion for forming a noise removing path in the housing member 420. Thus, the configuration of the pack connector 400 is further simplified, thereby improving the efficiency of the manufacturing process of the battery pack and reducing the manufacturing time and cost.

In particular, as indicated by P1 in the figures, the filtering member 410 may be configured such that at least a portion of the edge is inserted into the perforated hole HE In particular, the filtering member 410 may have a protrusion formed on at least a portion of the edge, and the protrusion may be inserted into the perforated hole H1 of the housing member 420. For example, as shown in FIGS. 13 and 14, the filtering member 410 may be configured in the form of a plate standing vertically, and the protrusion P1 may be formed to protrude in an upper direction (+z-axis direction) on the upper edge. In addition, the housing member 420 may have a perforated hole H1 of a slit shape formed at the upper portion. In this case, the protrusion P1 may be inserted into the perforated hole H1. Further, the protrusion P1 may be configured to protrude in the outer direction, for example in the upper direction, further to the housing member 420 after passing through the perforated hole H1.

According to this configuration of the present disclosure, as the protrusion P1 of the filtering member 410 and the perforated hole H1 of the housing member 420 are coupled by insertion, it is possible to improve the assembling force and the fixing force between the filtering member 410 and the housing member 420. In addition, in this case, due to the portion of the filtering member 410 formed to protrude out of the housing member 420, the coupling configuration between the pack connector 400 and the pack case 300 may be more easily implemented.

Moreover, in this configuration, as shown in FIGS. 13 and 14, at least a portion of the ground terminal 411 of the filtering member 410 may be formed at the protrusion P1 and exposed out of the housing member 420 through the perforated hole. In particular, at least a portion of the ground terminal 411 may be configured to be positioned outside the housing member 420. For example, seeing the configuration of FIGS. 13 and 14, at least a portion of the ground terminal 411 provided to the protrusion of the filtering terminal may be configured to protrude upward further to the housing member 420.

According to this configuration of the present disclosure, the path for discharging the noise component from the ground terminal 411 may be formed at a shorter distance, thereby improving the noise removing efficiency. In this case, the configuration where the ground terminal 411 of the filtering member 410 is in direct contact with the pack case 300 or the chassis may be more easily achieved. That is, in this configuration, since the ground terminal 411 of the filtering member 410 is configured to protrude outward, for example upward, further to the housing member 420, the ground terminal 411 of the filtering member 410 may more easily comes into contact with the pack case 300 or the vehicle chassis located at the outside.

Also preferably, at least a portion of the pack case 300 may be made of an electrically conductive material. The pack case 300 may be generally made of an electrically insulating material such as plastic to ensure electrical insulation to the cell assembly 100 or the battery control unit 200 accommodated therein. However, in this configuration, a portion of the pack case 300 may be made of an electrically conductive material.

For example, seeing the configuration of FIGS. 1 and 2, the upper case 301 and the lower case 302 are generally made of a plastic material, but the pack ground portion 310 may be provided to a portion of the upper case 301, particularly a region where the pack connector 400 is located. The pack ground portion 310 may be made of an electrically conductive material, for example a metal material such as copper, aluminum or iron. In particular, the pack ground portion 310 may be located at an outer side, for example at an upper side, further to the pack connector 400 in the battery pack.

In this configuration, the portion of the pack case 300 made of an electrically conductive material, namely the pack ground portion 310, may be electrically connected to the ground terminal 411 provided to the filtering member 410 of the pack connector 400.

Figure 15:
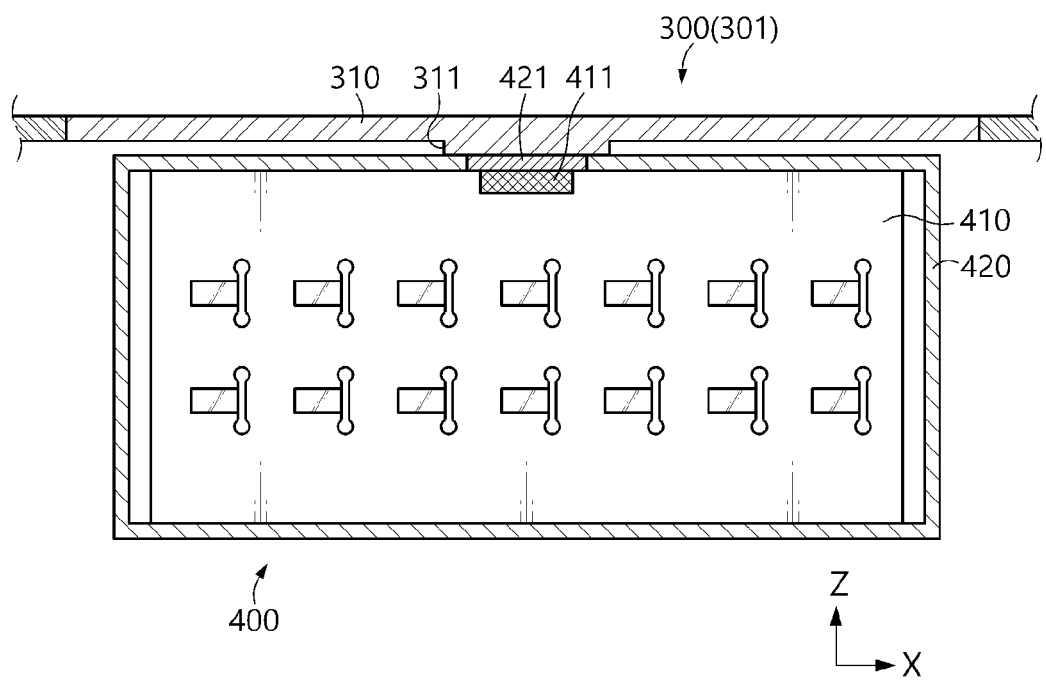
FIG. 15 is a diagram schematically showing an example of a front section of a portion A5 of FIG. 2.

FIG. 15 is a diagram schematically showing an example of a front section of a portion A5 of FIG. 2. In this embodiment, features different from the former embodiment will be mainly described.

Referring to FIG. 15, the pack case 300 may include a pack ground portion 310 made of an electrically conductive material. In this case, at least a portion of the pack ground portion 310 may be directly or indirectly connected to the ground terminal 411 of the filtering member 410 at the pack connector 400. For example, as shown in FIG. 15, if the pack connector 400 is configured such that the ground terminal 411 of the filtering member 410 is in contact with the ground connection portion 421 of the housing member 420, the pack ground portion 310 may be in direct contact with the ground connection portion 421 of the housing member 420. In particular, as shown in the figures, the pack ground portion 310 may include an inner projection 311 protruding downward, and the inner projection 311 may stably contact the ground connection portion 421 of the housing member 420. In this case, though not shown in the figures, the ground connection portion 421 of the housing member 420 may have a groove formed to be concave in an inner direction (an upper direction in the drawing, +z-axis direction) so that the inner projection 311 of the pack ground portion 310 is inserted therein. According to this configuration, the contact state between the pack ground portion 310 and the ground connection portion 421 may be maintained more stably.

Meanwhile, in the embodiment of FIG. 15, it is illustrated that the pack ground portion 310 is indirectly connected to the ground terminal 411 of the filtering member 410 through the ground connection portion 421 of the housing member 420, but the present disclosure is not necessarily limited to this form. For example, as shown in FIGS. 13 and 14, the pack connector 400 may be configured such that the ground terminal 411 of the filtering member 410 is exposed out of the housing member 420. In this case, the pack ground portion 310 may be configured to be in direct contact with the ground terminal 411 of the filtering member 410 exposed to the outside.

In addition, the pack ground portion 310 may be configured in various forms according to the position of the ground terminal 411 of the filtering member 410 and/or the position or number of the ground connection portion 421 of the housing member 420. For example, if the ground terminal 411 and the ground connection portion 421 of the pack connector 400 are configured as shown in FIG. 12, the pack ground portion 310 may be configured to surround the outer surface (an upper surface, a lower surface, a left surface and a right surface) of the pack connector 400 so as to contact the entire ground connection portion 421.

If the pack ground portion 310 and the ground terminal 411 of the filtering member 410 are directly or indirectly connected as above, noise components may be discharged from the ground terminal 411 of the filtering member 410 to the pack ground portion 310. In addition, the pack ground portion 310 may be in contact with a ground path of a device to which the battery pack is mounted, such as a vehicle chassis, so that the noise components introduced from the ground terminal 411 may be discharged out of the battery pack.

Here, the pack case 300 may include a chassis contact portion made of an electrically conductive material and formed to be convex outward at an outer surface of the portion thereof electrically connected to the ground terminal 411 of the filtering member 410. For example, as in the above embodiment, if the pack case 300 includes the pack ground portion 310 made of an electrically conductive material, the pack ground portion 310 may include the chassis contact portion. In addition, the chassis contact portion may be configured to easily contact the ground path outside the battery pack such as the vehicle chassis. This configuration will be described in more detail with reference to FIG. 16.

Figure 16:
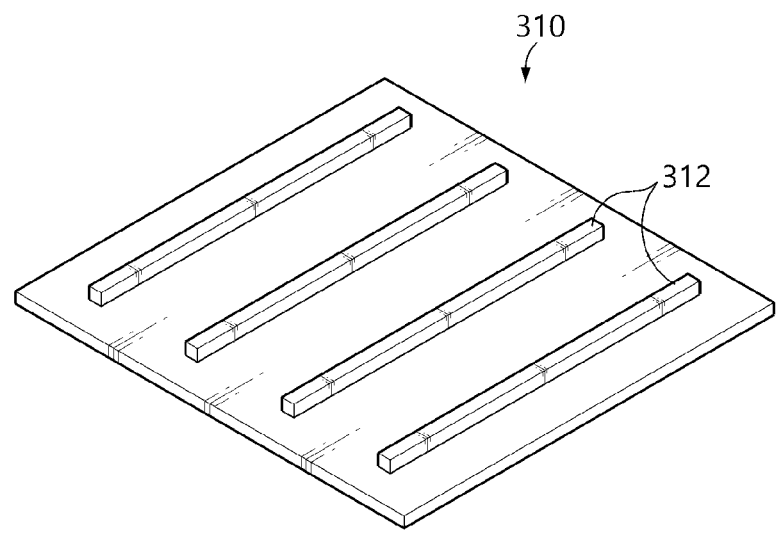
FIG. 16 is a perspective view schematically showing a pack ground portion according to another embodiment of the present disclosure.

FIG. 16 is a perspective view schematically showing a pack ground portion 310 according to another embodiment of the present disclosure. FIG. 16 may be an example where the pack ground portion 310 is modified in the battery pack of FIGS. 1 and 2. In this embodiment, features different from the former embodiment will be mainly described.

Referring to FIG. 16, the pack ground portion 310 is generally in the form of a plate and may include a chassis contact portion 312 protruding outward at an outer surface thereof. For example, as shown in the figures, the chassis contact portion 312 protruding upward may be provided to an upper surface of the pack ground portion 310. Even though it is illustrated in the figures that the chassis contact portion 312 is elongated in one direction, the chassis contact portion 312 may be shaped in various ways. In addition, one chassis contact portion 312 or a plurality of chassis contact portions 312 may be provided to the pack ground portion 310, namely the pack case 300.

In particular, the chassis contact portion 312 of the pack case 300 may be in contact with the chassis portion, which may serve as a ground path in a device to which the battery pack is mounted. For example, in the case of a battery pack mounted to a vehicle, the chassis contact portion 312 may be in direct contact with the vehicle chassis.

According to this configuration, noise components may be discharged to an external device such as a vehicle through the chassis contact portion 312 of the pack case 300.

Meanwhile, in the various embodiments above, it has been described that the pack case 300 is mostly made of an electrically insulating material, but the pack case 300 may also be made of an electrically conductive material such as metal entirely or mostly. In this case, the configuration where the ground terminal 411 of the filtering member 410 or the ground connection portion 421 of the housing member 420 is connected to the pack case 300 may be more easily achieved.

The battery pack according to the present disclosure may be applied to a vehicle such as an electric vehicle or a hybrid electric vehicle. That is, the vehicle according to the present disclosure may include the battery pack according to the present disclosure. In particular, an electric vehicle or the like may include an inverter, and the battery pack of the present disclosure may effectively prevent that noise generated by the inverter or the like is introduced into the battery pack or transmitted to another electronic device of the vehicle through the battery pack. Further, in the battery pack according to the present disclosure, the ground terminal 411 of the filtering member 410 may be directly or indirectly connected to the chassis of the vehicle.

In this specification, terms indicating directions such as "up", "down", "left", "right", "front" and "rear" used, but these terms are merely for convenience of description and may vary depending on the location of an object or the location of an observer, as apparent to those skilled in the art.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: cell assembly
110: secondary battery, 120: cartridge

200: battery control unit
210: control cable
300: pack case
301: upper case, 302: lower case
310: pack ground portion, 311: inner projection, 312: chassis contact portion
400: pack connector
410: filtering member, 411: ground terminal
420: housing member, 421: ground connection portion, 422: body
430: connection port
H1: perforated hole, P1: protrusion
D: connecting terminal of external device

What is claimed is:

1. A battery pack, comprising:
a cell assembly having at least one secondary battery;
a battery control unit configured to control a charging and discharging operation of the cell assembly;
a pack case configured to accommodate the cell assembly and the battery control unit in an inner space thereof; and
a pack connector connected to the battery control unit through a control cable and including:
a connection port positioned along at least one side of the pack case to be exposed for the connection with a connecting terminal of an external device; and
a filtering member embedded in the connection port and configured to filter noise on an electric path between the connection port and the control cable,
wherein the filtering member is a plate and includes:
a first surface connected to the connection port; and
a second surface opposite the first surface and connected to the control cable,
wherein the pack connector further includes a housing member having an inner space, and
wherein the filtering member is accommodated within the inner space of the housing member.

2. A battery pack,
a cell assembly having at least one secondary battery;
a battery control unit configured to control a charging and discharging operation of the cell assembly;
a pack case configured to accommodate the cell assembly and the battery control unit in an inner space thereof; and
a pack connector connected to the battery control unit through a control cable and including:
a connection port positioned along at least one side of the pack case to be exposed for the connection with a connecting terminal of an external device; and
a filtering member embedded in the connection port and configured to filter noise on an electric path between the connection port and the control cable,
wherein the filtering member is a plate and includes:
a first surface connected to the connection port; and
a second surface opposite the first surface and connected to the control cable,
wherein the filtering member is a circuit board.

3. The battery pack according to claim 1,
wherein at least one edge of the filtering member is in direct contact with the housing member.

4. The battery pack according to claim 3,
wherein the filtering member includes a ground terminal located at the at least one edge that is in direct contact with the housing member.

5. The battery pack according to claim 4,
wherein the housing member includes a ground connection portion made of an electrically conductive material to provide a path electrically connecting an inner surface and an outer surface of the housing member, and
wherein the ground terminal of the filtering member is in direct contact with the ground connection portion.

6. The battery pack according to claim 4,
wherein the filtering member is a polygonal plate, and
wherein the ground terminal is located to at least two edges of the filtering member that are in contact with the housing member.

7. The battery pack according to claim 1,
wherein the housing member includes a perforated hole formed to penetrate between an inner space and an outer space thereof, and
wherein the filtering member includes a ground terminal protruding out of the housing member through the perforated hole of the housing member.

8. The battery pack according to claim 7,
wherein at least a portion of an edge of the filtering member protrudes out of the housing member through the perforated hole.

9. The battery pack according to claim 1,
wherein at least a portion of the pack case is made of an electrically conductive material, and is electrically connected to a ground terminal of the filtering member.

10. The battery pack according to claim 9,
wherein the pack case includes a chassis contact portion made of an electrically conductive material protruding outward from an outer surface of the at least a portion of the pack case, and is electrically connected to the ground terminal of the filtering member.

11. A vehicle, comprising the battery pack according to claim 1.

12. An apparatus, comprising:
a case configured to accommodate, in an inner space thereof, a cell assembly having at least one secondary battery and a battery control unit configured to control a charging and discharging operation of the cell assembly;
a pack connector connected to the battery control unit through a control cable and including:
a connection port positioned along at least one side of the case to be exposed for the connection with a connecting terminal of an external device; and
a filtering member embedded in the connection port and configured to filter noise on an electric path between the connection port and the control cable,
wherein the filtering member is a plate and includes:
a first surface connected to the connection port; and
a second surface opposite the first surface and connected to the control cable,
wherein the pack connector further includes a housing member having an inner space, and
wherein the filtering member is accommodated within the inner space of the housing member.

* * * * *